US012675799B2

(12) United States Patent
Gunasekara

(10) Patent No.: US 12,675,799 B2
(45) Date of Patent: Jul. 7, 2026

(54) FACILITATING, QUANTIFYING AND ESTABLISHING SEQUESTERED CARBON IN AGRICULTURAL TREES AND WINE GRAPEVINES

(71) Applicant: CALIFORNIA BOUNTIFUL FOUNDATION, Sacramento, CA (US)

(72) Inventor: Amrith Gunasekara, West Sacramento, CA (US)

(73) Assignee: CALIFORNIA BOUNTIFUL FOUNDATION, Sacramento, CA (US)

( * ) Notice: Subject to any disclaimer, the term of this patent is extended or adjusted under 35 U.S.C. 154(b) by 91 days.

(21) Appl. No.: 18/593,915

(22) Filed: Mar. 3, 2024

(65) Prior Publication Data

US 2024/0320690 A1　　Sep. 26, 2024

Related U.S. Application Data

(60) Provisional application No. 63/453,495, filed on Mar. 21, 2023.

(51) Int. Cl.
　　*G06Q 30/018*　　(2023.01)
　　*G06Q 50/02*　　(2012.01)
(52) U.S. Cl.
　　CPC ........... *G06Q 30/018* (2013.01); *G06Q 50/02* (2013.01)
(58) Field of Classification Search
　　None
　　See application file for complete search history.

(56) References Cited

U.S. PATENT DOCUMENTS

| | | | | |
|---|---|---|---|---|
| 5,975,020 | A * | 11/1999 | Caveny | A01G 15/00 47/58.1 R |
| 8,504,252 | B2 | 8/2013 | Hamilton | |
| 8,728,755 | B2 * | 5/2014 | Rodgers | G06Q 10/04 423/445 R |
| 12,063,935 | B2 * | 8/2024 | Karathur | C08L 101/00 |
| 2002/0173980 | A1 | 11/2002 | Daggett et al. | |
| 2008/0201255 | A1 | 8/2008 | Green | |
| 2009/0099962 | A1 | 4/2009 | Green et al. | |
| 2011/0196710 | A1 | 8/2011 | Rao | |
| 2012/0089304 | A1 | 4/2012 | Hamilton et al. | |
| 2020/0027096 | A1 | 1/2020 | Cooner | |
| 2022/0237628 | A1 * | 7/2022 | Wollack | G06Q 10/08 |
| 2022/0240434 | A1 | 8/2022 | Rice et al. | |
| 2024/0296913 | A1 * | 9/2024 | McBratney | G01N 33/24 |
| 2025/0271262 | A1 * | 8/2025 | Sanchez | G01C 11/04 |
| 2025/0283865 | A1 * | 9/2025 | Shokanov | G01N 33/246 |

FOREIGN PATENT DOCUMENTS

WO　　　2020252013 A1　　12/2020

OTHER PUBLICATIONS

Canaveira P., et al., "Biomass Data on Cropland and Grassland in the Mediterranean Region", Final Report for Action A4 of Project MediNet, http://www.lifemedinet.com/, Mar. 2018, 66 Pages.
Locus AG: Partnership between Locus AG and Nori sets the stage for monetizing Carbon Farming (2020).

* cited by examiner

*Primary Examiner* — Paul S Schwarzenberg
(74) *Attorney, Agent, or Firm* — Buchalter; Jared Aizad

(57) ABSTRACT

A blockchain system is disclosed for tracking and exchanging carbon credits between providers and acquirers. The blockchain system can be a closed-loop gateway that exchanges tracked tokens from an original carbon credit provider through subsequent acquirers. Additionally, future projected carbon credits can be generated and/or verified.

10 Claims, 14 Drawing Sheets

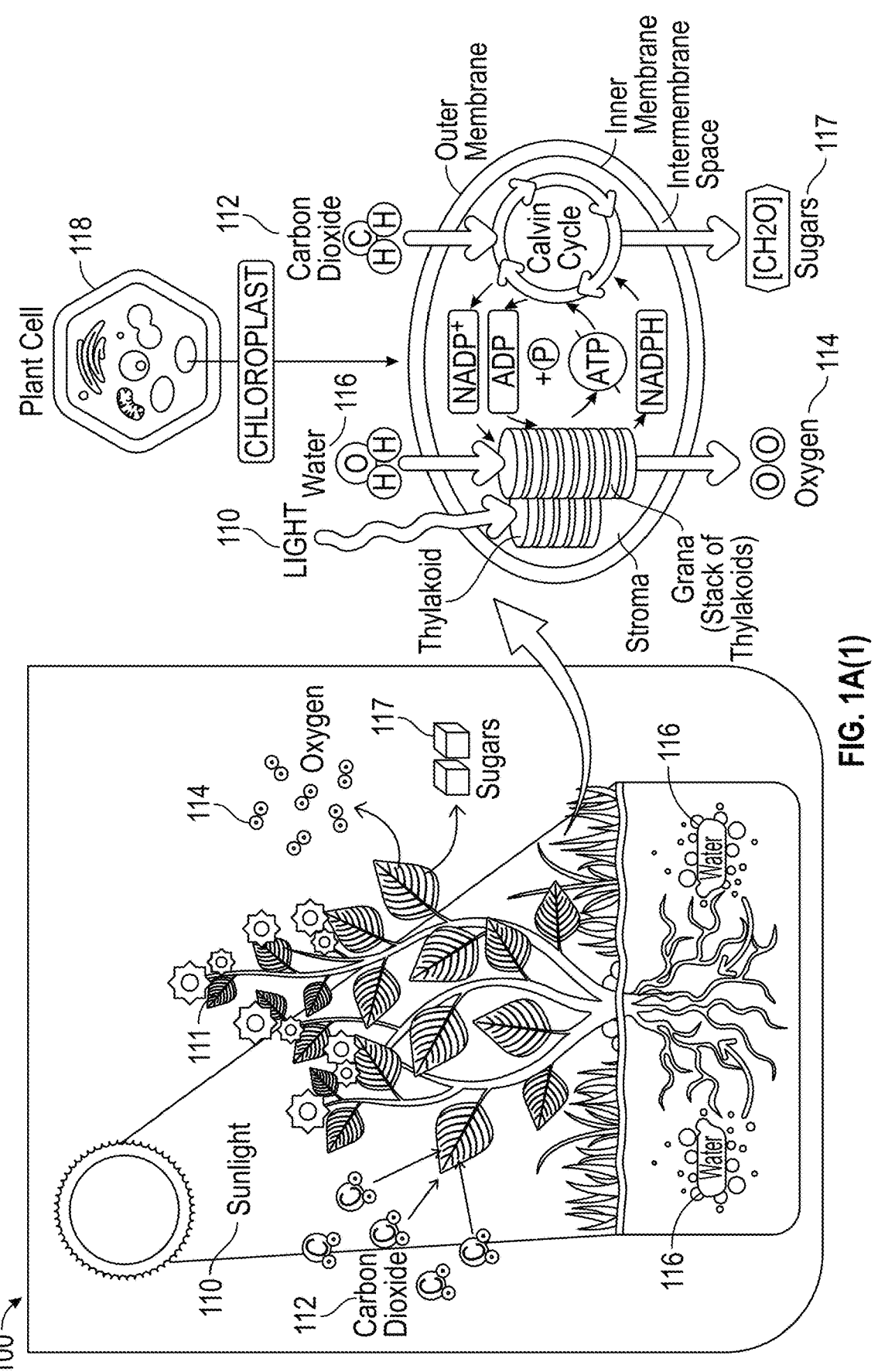
FIG. 1A(1)

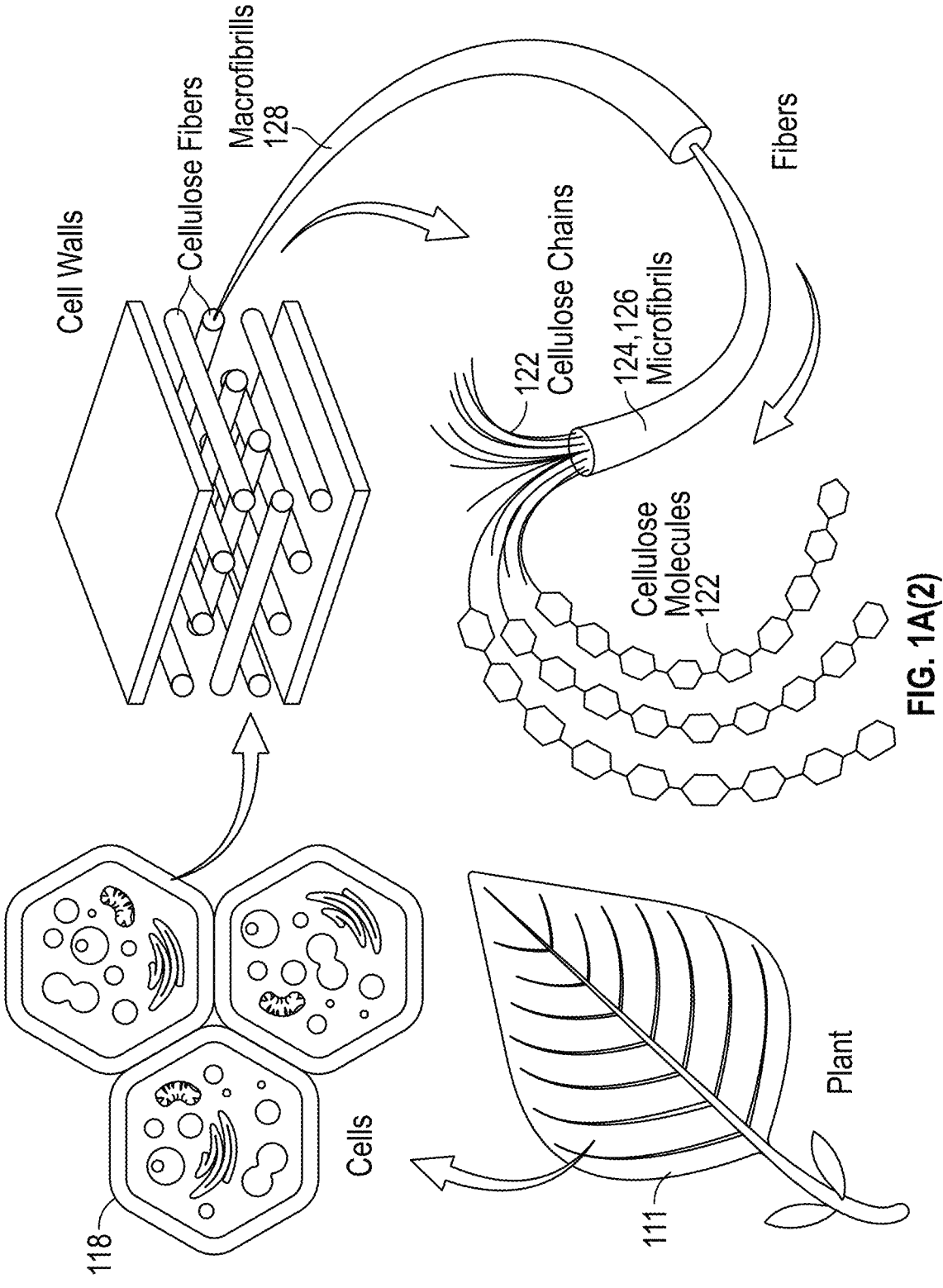
FIG. 1A(2)

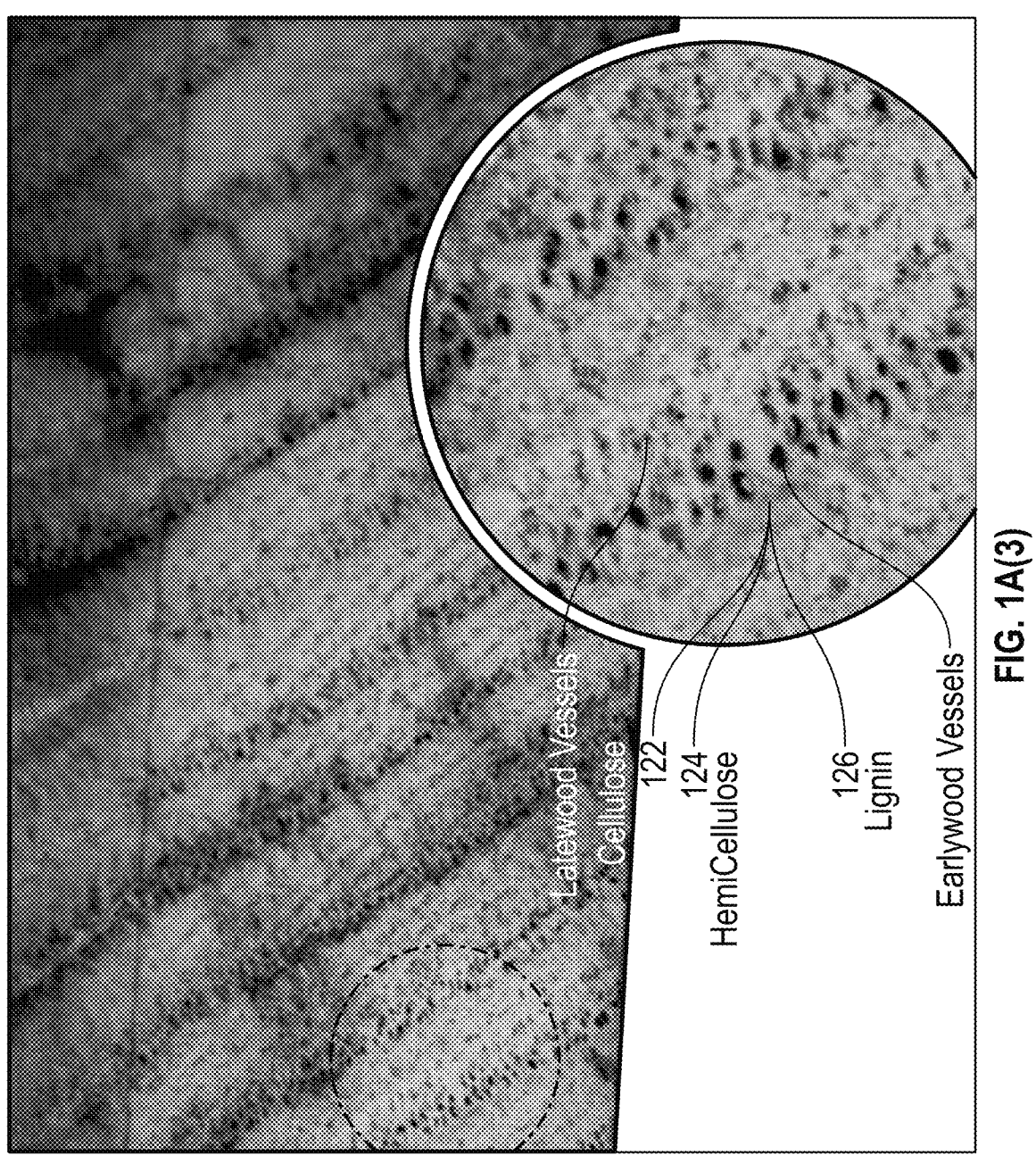
FIG. 1A(3)

150
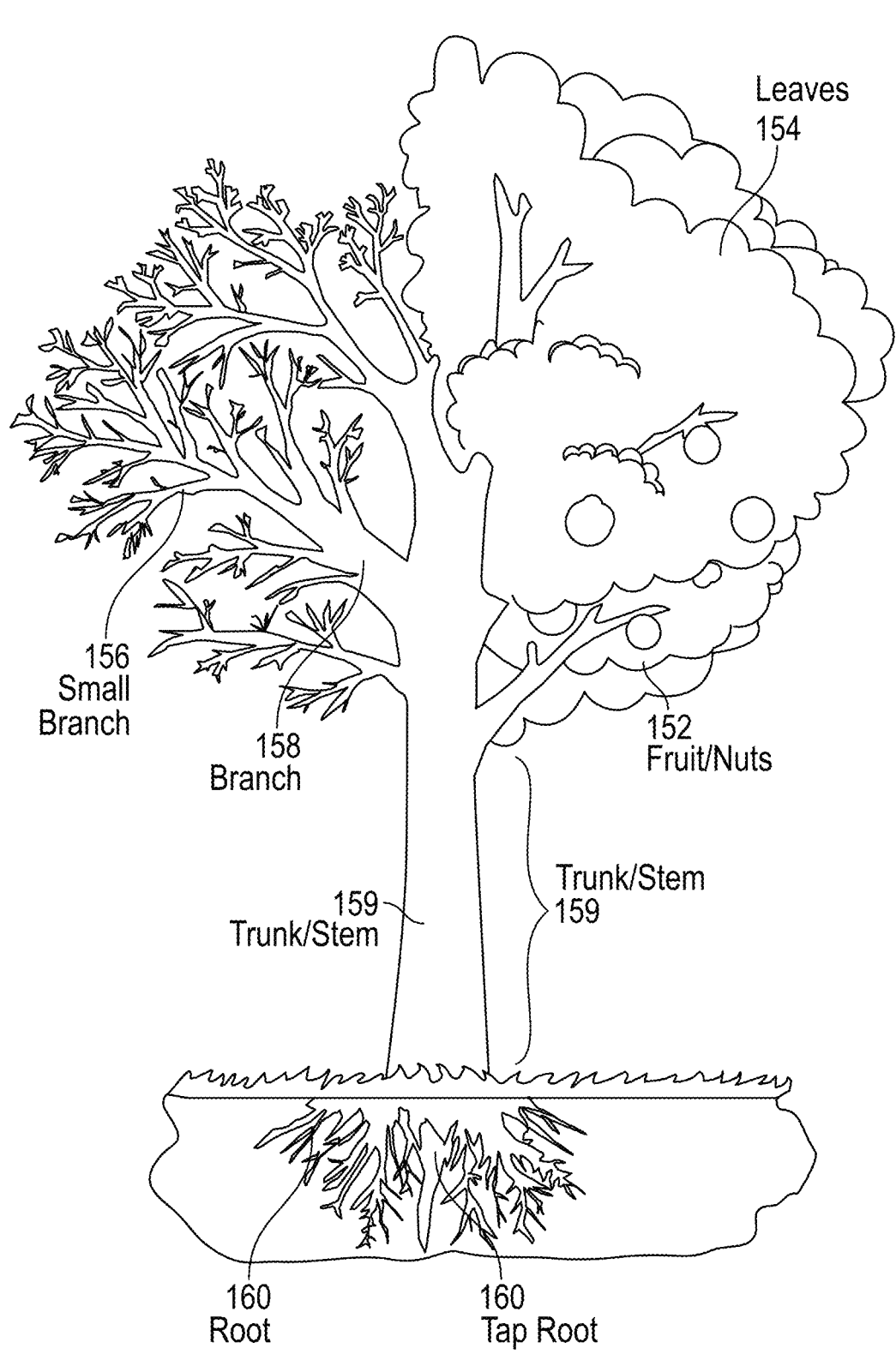
FIG. 1A(4)

| Type | Tree Age | Above Ground Tonne Carbon/hectare | Above Ground Tonne Carbon/acre | Below Ground Tonne Carbon/hectare | Below Ground Tonne Carbon/acre |
|---|---|---|---|---|---|
| Olive Trees | 1 | 0.9 | 0.36 | 0.1 | 0.08 |
| | 5 | 4.4 | 1.78 | 1.3 | 0.53 |
| | 10 | 8.5 | 3.43 | 2.5 | 1.01 |
| | 15 | 9.1 | 3.68 | 2.6 | 1.05 |
| | 20 | 9.1 | 3.68 | 2.6 | 1.05 |
| Grape Vines | 1 | 0.1 | 0.04 | 0.2 | 0.08 |
| | 5 | 0.4 | 0.16 | 0.8 | 0.32 |
| | 10 | 2.5 | 1.01 | 2.5 | 1.01 |
| | 15 | 4.9 | 1.98 | 3.9 | 1.58 |
| | 20 | 5.5 | 2.22 | 4.4 | 1.78 |
| Fruit and Nut Trees | 1 | 1.7 | 0.69 | 0.7 | 0.28 |
| | 5 | 4.3 | 1.74 | 2.3 | 0.93 |
| | 10 | 7.3 | 2.95 | 4.8 | 1.94 |
| | 15 | 8.3 | 3.35 | 5.6 | 2.26 |
| | 20 | 8.5 | 3.43 | 5.8 | 2.34 |

FIG. 2A

| Type | Age | Tonne Carbon/ hectare (TCHAG) | Tonne Carbon/ hectare to Tonne Carbon/ acre Conversion Factor (CF) | Tonne Carbon/acre (TCHAG x CF = TCAAG) | Total Acres in Project (TAPAG) | Total Project Carbon Above Ground (TCAAG X TAPAG = TPCAG) |
|---|---|---|---|---|---|---|
| Olive | 1 | 0.9 | 0.404 | 0.36 | Measured | Calculated |
| | 5 | 4.4 | 0.404 | 1.78 | Measured | Calculated |
| | 10 | 8.5 | 0.404 | 3.43 | Measured | Calculated |
| | 15 | 9.1 | 0.404 | 3.68 | Measured | Calculated |
| | 20 | 9.1 | 0.404 | 3.68 | Measured | Calculated |
| Fruit and Nut Trees | 1 | 1.7 | 0.404 | 0.69 | Measured | Calculated |
| | 5 | 4.3 | 0.404 | 1.74 | Measured | Calculated |
| | 10 | 7.3 | 0.404 | 2.95 | Measured | Calculated |
| | 15 | 8.3 | 0.404 | 3.35 | Measured | Calculated |
| | 20 | 8.5 | 0.404 | 3.43 | Measured | Calculated |

| Type | Age | Tonne Carbon/ hectare (TCHBG) | Tonne Carbon/ hectare to Tonne Carbon/ acre Conversion Factor (CF) | Tonne Carbon/acre (TCHBG x CF = TCABG) | Total Acres in Project (TAPBG) | Total Project Carbon Below Ground (TCABG X TAPBG = TPCBG) |
|---|---|---|---|---|---|---|
| Olive | 1 | 0.2 | 0.404 | 0.08 | Measured | Calculated |
| | 5 | 1.3 | 0.404 | 0.52 | Measured | Calculated |
| | 10 | 2.5 | 0.404 | 1.01 | Measured | Calculated |
| | 15 | 2.6 | 0.404 | 1.05 | Measured | Calculated |
| | 20 | 2.6 | 0.404 | 1.05 | Measured | Calculated |
| Fruit and Nut Trees | 1 | 0.7 | 0.404 | 0.28 | Measured | Calculated |
| | 5 | 2.3 | 0.404 | 0.93 | Measured | Calculated |
| | 10 | 4.8 | 0.404 | 1.94 | Measured | Calculated |
| | 15 | 5.6 | 0.404 | 2.26 | Measured | Calculated |
| | 20 | 5.8 | 0.404 | 2.34 | Measured | Calculated |

| Type | Age | Tonne Carbon/ hectare (TCHAG) | Tonne Carbon/ hectare to Tonne Carbon/ acre Conversion Factor (CF) | Tonne Carbon/acre (TCHAG x CF = TCAAG) | Total Acres in Project (TAPAG) | Total Project Carbon Above Below Ground (TCAAG X TAPAG = TPCAG) |
|---|---|---|---|---|---|---|
| Grapevine | 1 | 0.1 | 0.404 | 0.04 | Measured | Calculated |
| | 5 | 0.4 | 0.404 | 0.16 | Measured | Calculated |
| | 10 | 2.5 | 0.404 | 1.01 | Measured | Calculated |
| | 15 | 4.9 | 0.404 | 1.98 | Measured | Calculated |
| | 20 | 5.5 | 0.404 | 2.22 | Measured | Calculated |

| Type | Age | Tonne Carbon/ hectare (TCHBG) | Tonne Carbon/ hectare to Tonne Carbon/ acre Conversion Factor (CF) | Tonne Carbon/acre (TCHBG x CF = TCABG) | Total Acres in Project (TAPBG) | Total Project Carbon Above Below Ground (TCABG X TAPBG = TPCBG) |
|---|---|---|---|---|---|---|
| Grapevine | 1 | 0.2 | 0.404 | 0.08 | Measured | Calculated |
| | 5 | 0.8 | 0.404 | 0.32 | Measured | Calculated |
| | 10 | 2.5 | 0.404 | 1.01 | Measured | Calculated |
| | 15 | 3.9 | 0.404 | 1.58 | Measured | Calculated |
| | 20 | 4.4 | 0.404 | 1.78 | Measured | Calculated |

Identify location and size of source of potential carbon credits

404

Identify type, number and age of plants at identified location

406

Determine above ground biomass

408

Determine below ground biomass

410

Determine a total project carbon

412

Determine a total project carbon credit

414

Create total project carbon credit block

500 ⌐

FACILITATING, QUANTIFYING AND ESTABLISHING SEQUESTERED CARBON IN AGRICULTURAL TREES AND WINE GRAPEVINES

CROSS-REFERENCE

This application claims the benefit of U.S. Provisional Application No. 63/453,495, filed Mar. 21, 2023, entitled FACILITATING, QUANTIFYING AND ESTABLISHING SEQUESTERED CARBON IN AGRICULTURAL TREES AND WINE GRAPEVINES which application is incorporated herein in its entirety by reference.

BACKGROUND

Field: The present disclosure related to agricultural environmental resources management and particularly (but not limited to) to recognize, facilitate, validate, and add financial value to the carbon stored in agriculture fruit and nut trees and grapevines.

There are several biological systems that are recognized for sequestering carbon including forest trees and soils. The carbon in fruit trees and/or nut trees ("fruit/nut trees") and grapevines, produced as a result of photosynthesis using atmospheric carbon dioxide greenhouse gases, are not currently recognized as a carbon sequestration sink nor an asset that can be used in, for example, carbon markets. The current management practice to manage the woody material for agricultural fruit/nut trees and grapevines at the end of the productive life of the plant is to burn the material in an open fire (oxygenated). Current management practices, therefore do not allow for long-term permanent carbon capture and/or storage of woody materials (e.g., root, trunk, stems, and branches) in fruit/nut trees and grapevines.

Biochar, for example, would be understood by those skilled in the art as a charcoal product created from the thermal conversion of woody biomass in an oxygen lacking environment. The biochar are then used as an agricultural soil amendment. This process establishes additionality for carbon offset protocols. There are numerous environmental and agricultural benefits to the use of biochar and biochar offers further carbon sequestration benefits. Biochar, having at least 60% carbon, is sequestered in soils from 300 to 5,000 years. These values for biochar also establish permanency. Permanency and additionality are two of the four criteria established as guidelines to designing and implementing components that are necessary to ensure high quality carbon assets and credits are provided for greenhouse gas carbon trading programs.

What is needed is a way to recognize and identify, quantify and validate alternative management practices for further sequestering the carbon sequestered in agricultural fruit/nut trees and grapevines on a long-term basis. Sequestering the carbon as biochar, wood furniture, or woody construction material establishes long-term carbon sequestration of what was once atmospheric carbon dioxide greenhouse gases and therefore, can be used as an alternative to open combustion (under common oxygenated conditions). The new management practices, quantification and validation of the tree and grapevine agricultural carbon allow for permanence and can subsequently be used as a tradable asset in carbon markets or as a valued product or credit for meeting ESG (Environmental, Social, and Governance) commitments.

SUMMARY

Disclosed are ways to recognize, identify, quantify and validate alternative management practices for carbon sequestered in agricultural fruit/nut trees and grapevines on a long-term basis. The processes include recognizing, identifying, quantifying and validating carbon sequestered as biochar, wood furniture, or woody construction material that establish long-term carbon sequestration of what was once atmospheric carbon dioxide greenhouse gases and therefore, can be used as an alternative to open combustion (under common oxygenated conditions). The new management practices allow for permanence of the carbon in fruit/nut trees and grapevines and can be subsequently used as a tradable financial asset in carbon markets or as a valued product or credit for meeting ESG commitments. For example, the carbon from tree trunks can be ground and then reprocessed into particle board or compressed wood boards. These wooden boards can be used further to build walls in houses or commercial building. The buildings and houses, in general, have a lifespan of more than 100 years. Therefore, the carbon in the building is sequestered for the same time period as the building. A second example includes turning the tree trunks into large conference room tables or similar furniture for use in commercial buildings. These large tables have a significant life span often greater than 100 years. The carbon, therefore, in the table is sequestered for the same period of time.

The disclosed systems and methods provide processes of using the carbon stored in agricultural fruit/nut trees and grapevines as an asset in carbon trading markets. Additionally, the disclosed calculations, methodologies and validations can be applied to determine an amount of carbon stored in agricultural fruit/nut and grapevines and to determine how those values can be used to determine metric tons (or tonnes) carbon sequestered per acre and metric tons (or tonnes) carbon dioxide equivalent ($CO_2e$). Moreover, the disclosed systems, methods and validations can be used to identify the main components (roots, stems, trunks, and main branches) of the fruit/nut trees and grapevines that can be used to ensure a high degree of mathematical certainty regarding greenhouse gas reductions and carbon sequestration.

The use of new management practices (biochar, furniture, and woody construction materials) to ensure permanency of the carbon sequestered thereby ensuring the carbon in the fruit/nut trees and grapevines can be used as a tradable asset in carbon markets.

The disclosed systems and methods are configurable to recognize that agricultural fruit/nut trees and grapevines use the photosynthetic process to capture and sequester atmospheric greenhouse gases. Additionally the disclosed systems and methods are configurable to account for the fact that agricultural fruit/nut trees and grapevines hold much of the sequestered carbon in their roots, trunk, stems, and branches. Moreover, conversion of the woody material in agricultural fruit, nut, and grapevines to biochar, furniture, and woody construction materials provides long-term carbon sequestration benefits and eliminate the release of the sequestered carbon back into the atmosphere. The carbon sequestered in agricultural fruit/nut trees and grapevines can be quantified through methodologies described in this disclosure and the quantified carbon asset can be used as a financial credit in carbon markets.

Both the foregoing general description and the following detailed description are exemplary and explanatory only and are not restrictive of the disclosed embodiments, as claimed.

INCORPORATION BY REFERENCE

All publications, patents, and patent applications mentioned in this specification are herein incorporated by reference to the same extent as if each individual publication, patent, or patent application was specifically and individually indicated to be incorporated by reference.

US2002/0173980A1 published Nov. 21, 2002 to Daggett et al.;

US2008/0201255A1 published Aug. 21, 2008 to Green;

US2009/0099962A1 published Apr. 16, 2009 to Green et al.;

US2011/0196710A1 published Aug. 11, 2011 to Rao;

US2012/0089304A1 published Apr. 12, 2012 to Hamilton et al. issued as U.S. Pat. No. 8,504,252B2;

US2020/0027096A1 published Jan. 23, 2020 to Cooner;

US2022/0240434A1 published Aug. 4, 2022 to Rice et al.;

WO2020/252013A1 published Dec. 17, 2020 to WOLLACK et al.;

Canaveira, et al. (2018). Biomass Data on Cropland and Grassland in the Mediterranean Region. Final Report for Action A4 of Project MediNet. http://www.life-medinet.com/; and LOCUS AG: Partnership between Locus AG and Nori sets the stage for monetizing Carbon Farming (2020)

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1A(1)-(4) is a process for recognizing, quantifying, verifying and establishing carbon sequestration in fruit/nut trees and grapevines; FIG. 1B illustrates cellulose, FIG. 1C illustrates hemicellulose and FIG. 1D illustrates lignin;

FIG. 2A is a table showing metric tons per acre by tree types and grapevines with ages for above-ground and below-ground calculations;

FIG. 2B is a table showing calculations to determine total project carbon above-ground for olive, fruit, and nut trees;

FIG. 2C is a table showing calculation to determine total project carbon below-ground for olive, fruit, and nut trees;

FIG. 2D is a table showing calculations to determine the total project carbon above-ground for grapevines;

FIG. 2E is a table showing calculations to determine the total project carbon below-ground for grapevines;

DETAILED DESCRIPTION

Described are processes for recognizing, quantifying, verifying, validating, and establishing carbon sequestered in fruit/nut trees and grapevines as an asset that can be used in, for example, carbon credit markets that are designed to reduced greenhouse gases or for ESG purposes. The disclosed methods and systems are configurable to (1) create value corresponding to the carbon sequestered in fruit/nut trees and grapevines, (2) provide methodologies that support the carbon assets are real, additional, verifiable, and permanent, (3) require specific management practices to be used to establish the carbon sequestered as an asset and/or credit to be used in carbon trading markets, and (4) predict future value of a tracked carbon credit.

The parameters of real, additional, verifiable, validatable, and permanent are core quality criteria established as guidelines to designing and implementing components that are necessary to ensure high quality carbon assets and credits are provided for greenhouse gas carbon trading programs. The described systems and processes use blockchain to track a transaction related to the identified and calculated carbon credit. Additionally, the systems are configurable to predict a future value for blockchain based on analysis of prior growth patterns and future prediction of environmental conditions impacting growth rates.

Metric tonne is equal to 2204 pounds or 1000 kgs. For the disclosed methodology a ton can also be used which equates to 2240 lbs or 1015 kgs.

I. PROCESSES

Figures 1B, 1C:
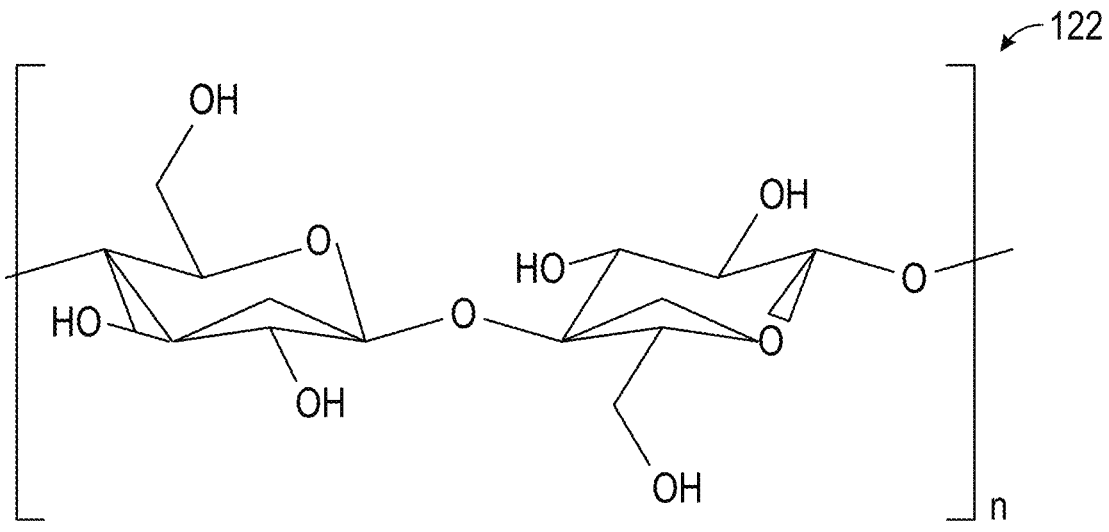
Figure 1D:
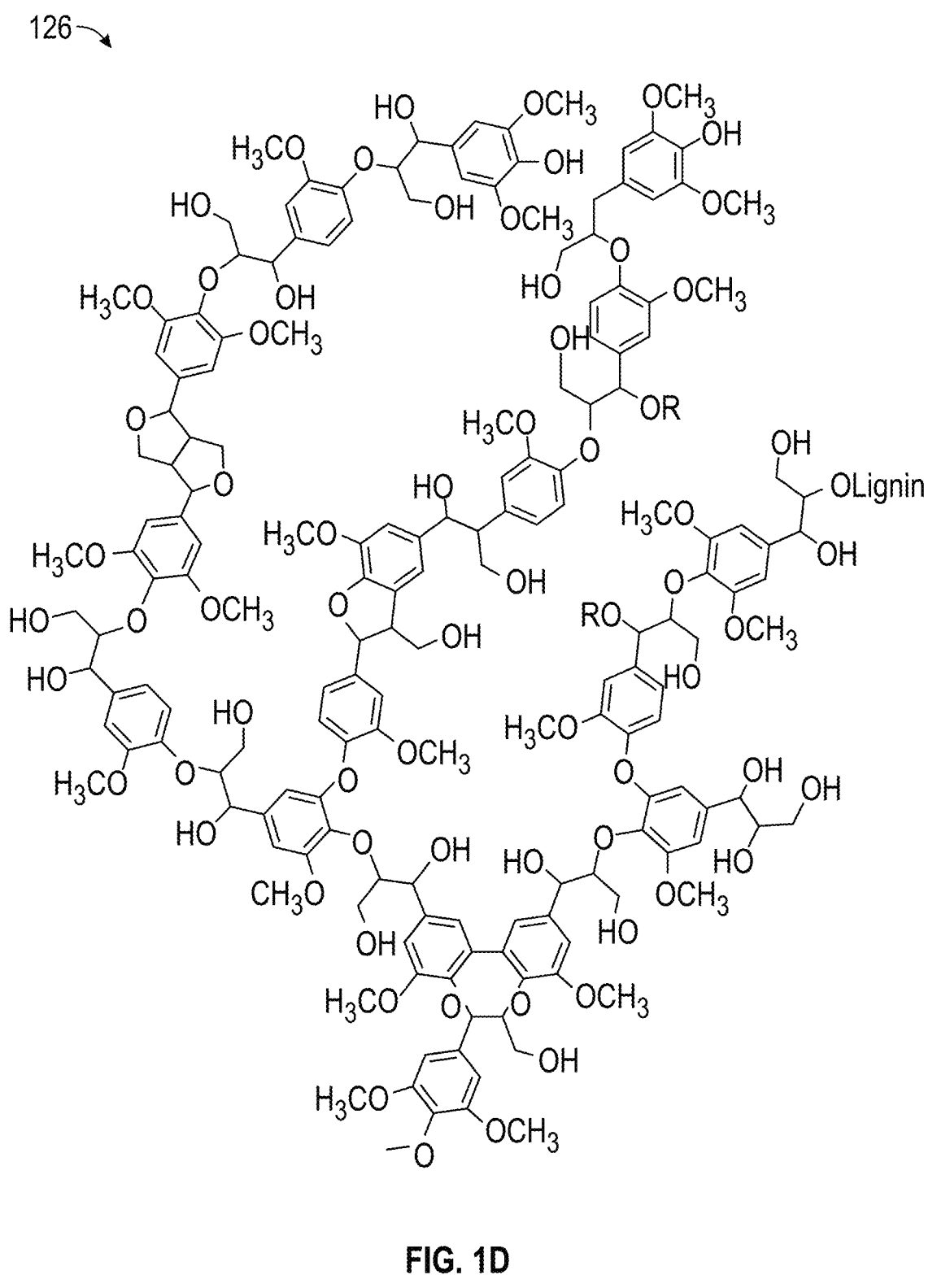

A process 100 shown in FIG. 1A(1)-(4), carbon dioxide 112 enters the leaves of a plant 111. The plant's cells 118 uses water 116 via, for example, the roots and that water is combined with carbon dioxide 112 to produce sugars 117 using energy from sunlight 110. The process is commonly known as photosynthesis. Oxygen 114 is a byproduct of the process. The plant is comprised of plant cells 118 that produce sugars which are used in the production of ligno-cellulose biomass, cellulose 122 and lignin 126 and 128. Exemplar strictures for cellulose 122 is shown in FIG. 1B, hemicellulose 124 is shown in FIG. 1C, and lignin 126 is shown in FIG. 1D. Biomass components in perennial crops 150 (trees and grapevines) includes: fruits/nuts and grapes 152, leaves, 154, small branches 156, main stem/large branches 158, trunk/stem 159, and roots 160.

Agricultural management activities can be designed to increase the removal of carbon dioxide greenhouse gases from the atmosphere and provide for sequestration of the carbon in fruit/nut trees and grapevine trunks, primary branches, roots, and stems. Fruit/nut trees and grapevines utilize atmospheric carbon dioxide and along with water and sunlight, through the photosynthetic process, produce sugars. Those sugars are subsequently used for the plants building blocks including cellulose 122, hemicellulose 124, and lignin 126. Lignin 126 is a complex carbon-based polymer deposited in the cell walls and roots of plants and the key molecules in woody material in agricultural trees and grapevines on farms. Approximately 50% of lignin consists of carbon molecules.

Scientific data is extracted 200 as shown in FIG. 2A, processed and analyzed to identify a relative carbon fraction in the above- and above-ground woody biomass of olive, vineyard, and fruit/nut trees as shown in FIG. 2A. An average carbon fraction of 47%, 48%, and 46%, respectively was extracted for olive, vines, and fruit trees, respectively. A default factor of 47%±3% for permanent crops will be used to establish a relative estimated carbon stored in woody fruit/nut trees and grapevines. The above-ground default value will be significant at a minimum growth period of over 10 years for olives, 15 years for grapevines, and 10 years for fruit trees. Following the minimum grown periods, growth and addition of carbon does not occur significantly in fruit/nut trees and grapevines. Scientific data identified the relative carbon fraction in below-ground woody biomass of olive, vineyard, and fruit trees. Average carbon fraction was 45% for olive, vines, and fruit trees. For below-ground woody biomass a default factor of 45% for permanent crops was used. The below-ground default value data applies to fruit/nut tree and grapevine crops at maturity only (>20 years). The data in FIG. 2A can be used to calculate and estimate total biomass of agricultural fruit/nut trees and grapevines.

The total biomass carbon that is below-ground is cellulose, hemicellulose, and lignin carbon and the same carbon substances are above-ground carbon for agricultural fruit/nut trees and grapevines. The total of below-ground and above-ground carbon in fruit/nut trees and grapevines can be used to estimate the amount of carbon in one acre or more trees or grapevines. Using these disclosed processes, for example, one carbon credit has been established as removing one metric tonnes (or ton can be used) of carbon dioxide that is then not released to the atmosphere. Based on the values in FIG. 2A, the total carbon value is multiplied by 3.67 to determine the metric Tons CO2 equivalent.

The methodologies provide estimated values for carbon sequestered in agricultural fruit trees, nut trees and grapevines can be verified with in-field measurements by providing methodologies that support the carbon assets are real, additional, verifiable, and permanent. These estimated values of sequestered carbon are quantified into a blockchain that is verifiable and trackable.

This disclosure describes the verification methodologies to be used and field measurements. The disclosure also describes prediction of future value for a calculated carbon sequestered value for an existing calculated value.

I.A. Above-Ground Biomass in Agricultural Fruit Trees and Nut Trees.

The methodology for determining above-ground biomass in agricultural fruit trees and nut trees is determined for the tree crop on one acre for the project. If multiple tree crops are included in the project, a combination of default values is used to make the calculation. Preliminarily, the age of the trees using historic planting information at farm is determined. If multiple tree ages are involved in the determination, use combination of default values. Based on the information provided in the table 210 in FIG. 2B, tree crop and age are used to calculate total project carbon above-ground (TPCAG) in metric tons of carbon. If multiple crops are grown in an acre with different aged trees, a combination of the values in FIG. 2B is used. The combination of values can be weighted to correlated to the percentage of acreage occupied by a particular crop.

I.B. Below-Ground Carbon in Agricultural Fruit Trees and Nut Trees.

The methodology for determining the below-ground carbon biomass in fruit trees and nut trees is determined for the tree crop on one acre for the project. Based on the information provided in the table 220 in FIG. 2C, tree crop and age are used to calculate total project carbon below-ground (TPCBG) in metric tons of carbon. If multiple tree crops are included in the project, a combination of default values is used to make the calculation. Determine age of the trees using historic planting information at farm. If multiple tree ages are involved in the project, a combination of default values from the table 220 in FIG. 2C is used. The metric tons of carbon/acre is calculated Canaveira et al. (page 35) The data is further extrapolated to show $CO_2e$ carbon and how the carbon is linked to a financial asset. The citation only determined the amount of carbon in the tree. The carbon is converted from tonnes carbon/hectar to tonnes carbon/acre. We also assign a $ value to it. See examples below. If multiple crops are grown in an acre with different aged trees or on different acres, a combination of the values in FIG. 2C are used.

I.C Total-Carbon in Agricultural Fruit Trees and Nut Trees and Value.

The methodology for determining carbon in agricultural fruit trees and nut trees includes adding below-ground carbon values with above-ground carbon values taking into consideration specific tree types, ages, and acres to determine total project carbon. Thus the total project carbon (TPC) is: TPCAG+TPCBG=TPC. This value can be multiplied by the dollar value for carbon at a given time period to determine total value for project based on available carbon in the fruit/nut trees including olive trees.

I.D. Projected-Carbon in Agricultural Fruit Trees and Nut Trees and Value.

The methodology for determining future carbon in agricultural fruit trees and nut trees includes adding below-ground carbon values with above-ground carbon values taking into consideration specific tree types, average longevity of the one or more fruit trees and nut trees, projected weather, and acres to determine total projected project carbon over a period of time. Evaluating the current age of the fruit trees and nut trees and their average longevity and projected growth rate (taking into consideration projected weather patterns) can provide a future value of the projected sequestered carbon at various times in the future. Thus the total projected future carbon (TFC) is: ((TPC)*(Acreage) *Number of trees or vines per acre))=TFC. This value can be multiplied by the dollar value for carbon at a given time period to determine total value for project based on available carbon in the fruit/nut trees including olive trees.

Example 1: Quantification of Total Project Carbon for Fruit Trees

The process of quantifying a total project carbon in agricultural fruit trees and nut trees for 20-year old trees on 100 acres at a value of $40/metric tonne of $CO_2e$ is determined as follows:

Step 1: Calculate total project carbon above-ground (TPCAG)=100 acres×3.43 metric tonnes carbon per acre (TCAAG). Result is 343 metric tonnes carbon.

Step 2: Calculate total project carbon below-ground (TPCBG)=100 acres×2.34 metric tonness carbon per acre (TCABG). Result is 234 metric tonnes carbon.

Step 3: Calculate total project carbon (TPC)=343+ 234=577 metric tonnes carbon.

Step 4: Convert metric tonnes carbon to metric tonnes $CO_2e$=577×3.67=2,117.59 metric tonnes $CO_2e$.

Step 5: Calculate $ value of carbon=2,117.59×$40=$84, 703.60

I.E. Above-Ground Biomass in Agricultural Grapevines.

The methodology for determining above-ground biomass in agricultural grapevines on, for example, one acre of land for an exemplar project requires: determining the age of the grapevines using, for example, historic planting information at a farm; and calculating total project above-ground carbon in metric tons carbon using data from FIG. 2D. If multiple grapevines grow on the land subject to the biomass calculation with different ages, on different acres, calculations are made using multiple data elements.

I.F. Below-Ground Biomass in Agricultural Grapevines.

The methodology for determining the below-ground biomass in agricultural grapevines on, for example, one acre of land for an exemplar project requires: determining the age of the grapevines using, for example, historic planting information for the farm; applying the table in FIG. 2E based on tree crop and age to calculate total project below-ground carbon in metric tons carbon. If multiple grapevines with different ages are grown on different acres, use combination of default values in FIG. 2E.

I.G. Total Carbon in Agricultural Grapevines.

The methodology for determining the total carbon in grapevines for the same project requires: adding the below-ground carbon values with above-ground carbon values with grapevine specific ages and acres to determine total project carbon. Thus the total project carbon is: TPCAB+TPCBG=TPC. This value can be multiplied by the dollar value for carbon at a given time period to determine total value for project based on available carbon in the fruit/nut trees including olive trees.

Example 2: Quantification of Total Project Carbon for Grapevines

The process of quantifying a total project carbon in agricultural grapevines for 20-year old grapevines on 100 acres at a value of $40/metric tonne of $CO_2e$ is determined as follows:

Step 1: Calculate total project carbon above-ground (TPCAG)=100 acres×2.22 metric tons carbon per acre (TCAAG). Result is 222 metric tonnes carbon.

Step 2: Calculate total project carbon below-ground (TPCBG)=100 acres×1.78 metric tons carbon per acre (TCABG). Result is 178 metric tonnes carbon.

Step 3: Calculate total project carbon (TPC)=222+178=400 metric tonnes carbon.

Step 4: Convert metric tonnes carbon to metric tonnes $CO_2e$=400×3.67=1,468 metric tonnes $CO_2e$.

Step 5: Calculate $ value of carbon=1,468×$40=$58,720.

To provide for specific management practices to be used to establish the carbon sequestered as a financial asset and credit that can be used in the carbon trading markets the analysis and application of estimated carbon values sequestered in trees are used in order to ensure the derived estimate can be qualified as a carbon credit. Additionally, emissions reduction benefits if a project would not have occurred absent the offset program or is additional to activities that would have otherwise occurred in the absence of the offset program.

The current status of handling agricultural biomass at the end of an orchard tree and grapevine productive life is to burn (under oxygenated conditions) the biological material or mulching of that material back into the soil. Burning of the biomass produces carbon dioxide greenhouse gases and ash residues having non-carbon elements. Further burning of biomass leads to numerous other environmental concerns such as particulate matter formation and poor overall air quality. Another potential disposal of the woody cellulose, hemicellulose, and lignin material following the productive life of a tree or grapevine is the grinding and chipping of the biological material and its inclusion in the soil as an amendment. Although this practice has greenhouse gas benefits in building the soil organic carbon pool slowly over time, data shows that unless additional carbon sources are added to the soil, 90% of the carbon (added with the ground wood chips) could be released to the environment through aerobic microbial degradation of the biological material (roots, trunks, grapevine stems).

The management practice change that will be "additional" to activities that would have otherwise not have occurred in this methodology is the creation of biochar or using the woody cellulose, hemicellulose, and lignin material for furniture or housing construction materials. Another management practice that can be additional is the conversion of the woody material from the trees and grapevines into housing building materials or furniture. These converted wood products are expected to have a life expectancy of 100-150 years and potentially more if the wood products are recycled and used again for housing or commercial buildings. A third potential "additional" option is to use the woody material for the production of a renewable fuel. Biofuels can be produced from woody materials that have a low carbon intensity score. The woody materials from maybe used for fuel production that will allow for additional incentives such as payments from the low carbon fuel standard (LCFS) Program.

II. COMPUTING AND NETWORK ENVIRONMENTS

Many example implementations have been described above. The disclosed systems are configurable to operate on computer systems that can be a combination of on-premises, in the cloud (hosted externally), mobile devices, IoT sensors attached to equipment stationary or mobile such as to UAV (Unmanned Aerial Vehicles or drones) and an extensible set of third party supplied applications and devices that extend the functionality of the system. Distributed network architecture ensures network stability, redundancy and resilience built into network. A distributed computing network built using the distributed network architecture described above can run distributed applications, for example, autonomous distributed building or device control systems, web services, secure peer to peer networking, distributed data management services, cloud storage, distributed databases, decentralized groups or companies, based distributed trading platforms, cryptographic tokens, document processing, etc.

A plurality of computing devices can be deployed in implementing the disclosed systems and methods. Computing devices include one or more: processors, memories, storage devices, high-speed interfaces connecting to memory and high-speed expansion ports, and low speed interfaces connecting to low speed bus and storage device. Each of component of the one or more computing devices can also be interconnected using various busses, and can be mounted on a common motherboard or in other manners as appropriate. Processor can process instructions for execution within computing device, including instructions stored in memory or on storage device to display graphical data for a GUI on an external input/output device, including, e.g., each computing device can include a display coupled to high speed interface. In other implementations, multiple processors and/or multiple busses can be used, as appropriate, along with multiple memories and types of memory. Also, multiple computing devices can be connected, with each device providing portions of the operations (e.g., as a server bank, a group of blade servers, or a multi-processor system).

Memories are configurable to store data within computing devices. In one implementation, memory is a volatile memory unit or units. In another implementation, memory is a non-volatile memory unit or units. Memory can also be another form of computer-readable medium (e.g., a magnetic disk, optical disk or solid state disk). Memory can also be non-transitory.

Storage devices are capable of providing mass storage for computing device. In one implementation, storage device can be or contain a computer-readable medium (e.g., a floppy disk device, a hard disk device, an optical disk device, or a tape device, a flash memory or other similar solid state memory device, or an array of devices, such as devices in a storage area network or other configurations). A computer program product can be tangibly embodied in a data carrier. The computer program product also can contain instructions that, when executed, perform one or more methods (e.g., those described above.) The data carrier is a computer- or machine-readable medium, (e.g., memory, storage device, memory on processor, and the like).

High-speed controllers manage bandwidth-intensive operations for computing device, while low speed controllers manage lower bandwidth-intensive operations. Such allocation of functions is an example only. In one implementation, high-speed controller is coupled to memory, display (e.g., through a graphics processor or accelerator), and to high-speed expansion ports, which can accept various expansion cards. In the implementation, low-speed controllers are coupled to storage devices and low-speed expansion port. The low-speed expansion port, which can include various communication ports (e.g., USB, Bluetooth®, Ethernet, wireless Ethernet), can be coupled to one or more input/output devices (e.g., a keyboard, a pointing device, a scanner, or a networking device including a switch or router, e.g., through a network adapter). Computing devices can be implemented in a number of different forms, as shown in the figure. For example, computing devices can be implemented as standard server, or multiple times in a group of such servers. Computing devices can be implemented as part of rack server system. In addition or as an alternative, it can be implemented in a personal computer (e.g., laptop computer). In some examples, components from computing devices can be combined with other components in a mobile device (not shown), e.g., device. Each of such devices can contain one or more of computing devices and an entire system can be made up of multiple computing devices communicating with each other.

Computing device includes processor, memory, an input/output device (e.g., display, communication interface, and transceiver) among other components. Device also can be provided with a storage device, (e.g., a micro drive or other device) to provide additional storage. Each of the devices, processor, display, memory, communication interfaces, and transceiver, are interconnected using various buses, and several of the components can be mounted on a common motherboard or in other manners as appropriate.

A processor can execute instructions within computing device, including instructions stored in memory. The processor can be implemented as a chipset of chips that include separate and multiple analog and digital processors. The processor can provide, for example, for coordination of the other components of device, e.g., control of user interfaces, applications run by device, and wireless communication by device.

Processor can communicate with a user through control interface and display interface coupled to display. Display can be, for example, a TFT LCD (Thin-Film-Transistor Liquid Crystal Display) or an OLED (Organic Light Emitting Diode) display, or other appropriate display technology. Display interface can comprise appropriate circuitry for driving display to present graphical and other data to a user. Control interface can receive commands from a user and convert them for submission to processor. In addition, external interface can communicate with processor, so as to enable near area communication of device with other devices. External interface can provide, for example, for wired communication in some implementations, or for wireless communication in other implementations, and multiple interfaces also can be used.

Memory stores data within computing device. Memory can be implemented as one or more of a computer-readable medium or media, a volatile memory unit or units, or a non-volatile memory unit or units. Expansion memory also can be provided and connected to device through expansion interface, which can include, for example, a SIMM (Single In Line Memory Module) card interface. Such expansion memory can provide extra storage space for device, or also can store applications or other data for device. Specifically, expansion memory can include instructions to carry out or supplement the processes described above, and can include secure data also. Thus, for example, expansion memory can be provided as a security module for device, and can be programmed with instructions that permit secure use of device. In addition, secure applications can be provided through the SIMM cards, along with additional data, (e.g., placing identifying data on the SIMM card in a non-hackable manner).

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory, expansion memory, and/or memory on processor), which can be received, for example, over transceiver or external interface.

Device can communicate wirelessly through communication interface, which can include digital signal processing circuitry where necessary. Communication interface can provide for communications under various modes or protocols (e.g., GSM voice calls, SMS, EMS, or MMS messaging, CDMA, TDMA, PDC, LTE, WCDMA, CDMA2000, or GPRS, among others or any newly developed communication protocols) Such communication can occur, for example, through radio-frequency transceiver. In addition, short-range communication can occur, e.g., using a Bluetooth®, WiFi, or other such transceiver (not shown). In addition, GPS (Global Positioning System) receiver module can provide additional navigation- and location-related wireless data to device, which can be used as appropriate by applications running on a device. Sensors and modules such as cameras, microphones, compasses, accelerators (for orientation sensing), etc. may be included in the device. It will be appreciated by those skilled in the art, that the devices and systems described can communicate using many of the common and emerging internet-of-things (IoT) protocols depending on the situation and the environment. Examples of protocols include Zigbee, LoRa (wide area long range protocol), NB-IoT (narrow band IoT), WiFi, BLE (blue tooth low energy).

Computing device can be implemented in a number of different forms, as shown in the figure. For example, it can be implemented as cellular telephone. It also can be implemented as part of smartphone, tablet, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

III. BLOCKCHAIN

Exemplary embodiments include an electronic, online closed-loop blockchain gateway and transactional exchange blockchain and systems, components, and computer-implemented methods for operation. This includes for example, hardware-based methods of operation and hardware systems and components that are configured as and include, for example without limitation, at least one hardware processor(s) that may be a part of larger computing systems and servers and components. Such are coupled to a network or networks, storage devices, and other hardware and software components and systems. Such components, systems, and computer and hardware implemented methods of operation, which include such exemplary processors, are in communication with one or more storage servers and cryptographic key pair, payment, credit, storage, and other servers. These systems, hardware implemented methods, and components, including the exemplary hardware computer processors, are configured to establish the gateway and closed-loop transactional exchange blockchain across the systems, components, and servers.

The processors and related computing, hardware, and software systems and methods of operation are configurable to electronically forge blocks for the contemplated blockchains, such as a parent blockchain, that form a closed-loop transactional exchange, wherein the forged blocks include and/or identify one or more cryptographic, carbon credit asset, carbon credit access right, and other genesis tokens containing data, credentials, and information of the exchange of the carbon credit(s). These methods, components, and systems are further configured to electronically forge one or more carbon credit supplier and carbon credit acquirer (or purchaser) child blocks that can each be forked from a genesis block and having one or more respective carbon credit supplier and carbon credit acquirer cryptographic, carbon credit asset, carbon credit access right, account, and other tokens having data and credentials.

The system and methods of operation are also configured to electronically identify one or more salable or transferable carbon credit supplier products, by forging at least one carbon credit supplier asset child block, of the one or more carbon credit supplier child blocks, which each have at least one carbon credit supplier product asset token corresponding to the one or more transferable carbon credit supplier carbon credits, wherein a one to one, many to one, and one to many relationship between blocks, tokens, and carbon credits may be utilized. The methods and components of the system also receive by the network from the key pair server, and in response to a first carbon credit acquirer request, a private key token for a private key of the carbon credit acquirer, which corresponds to a public carbon credit acquirer key, which may be stored in the child carbon credit acquirer blocks and tokens contained therein.

One or more carbon credit acquirer account tokens and access right tokens, of the one or more carbon credit acquirer child blocks that correspond to the private key are also identified by the system components and operation methods to enable electronic carbon credit acquirer authentication and verification. The system may also be configured to electronically receive by the network a first carbon credit acquirer payment via a payment server, which corresponds to the identified one or more carbon credit acquirer account tokens. The system components receive the payment, by forging payment carbon credit supplier and carbon credit acquirer child blocks in the blockchain, wherein each block has a carbon credit supplier fiat asset token that identifies the first carbon credit acquirer payment.

The system components and methods of operation, including for example the contemplated processors, also exchange for the first carbon credit acquirer payment, one or more of the identified carbon credit supplier products, by forging carbon credit supplier and carbon credit acquirer product exchange child blocks in the blockchain or blockchains of the system, in response to the first carbon credit acquirer payment, wherein each forged block includes generated carbon credit supplier asset exchange tokens identifying the one or more carbon credit supplier products that are exchanged.

Such computer-implemented methods, processors, components, and systems are also configured to electronically generate a carbon credit supplier access right token, which defines at least one and or one or more exchange limits sale and resale of one or more salable carbon credit supplier products. The exchange sale and resale limits include, for purposes of example but not for limitation, at least one and or one or more of a predetermined: (1) number of sales and resales of a carbon credit, (2) price of the carbon credit, (3) price range for the carbon credit, (4) future predicted value of a carbon credit, (5) number of carbon credits, (6) carbon credit purchaser identity, and/or (7) geographic location and region of carbon credit agricultural trees and/or grapevines. Carbon credit suppliers can in this way electronically assign rights and rules to salable or transferable carbon credit. Future predictions can be based on one or more of forecasted weather, supplier agricultural management practices, historical growth analysis, future growth prediction, etc. Additionally, predicted future values can be calculated as a net present value of a future amount or the predicted future values.

In variations, the contemplated components, systems, computer-implemented methods, and processors are configured to electronically generate one or more or of at least one carbon credit acquirer digital wallet or account asset token that is identified and or contained by at least one forged carbon credit acquirer child block in the blockchain(s) of the system. The at least one carbon credit acquirer digital wallet or account asset token further identifies one or more received carbon credit acquirer payments, carbon credit supplier fiat asset tokens, carbon credit supplier asset tokens, and other carbon credit acquirer and carbon credit supplier asset tokens, which are and may be established by the closed-loop transactional exchange and gateway systems, components, and methods of operation.

Arrangements of the computer-implemented methods, processors, components, and systems, are configured to electronically forge at least one carbon credit supplier asset child block in the contemplated blockchain(s), which identify a salable or transferable digital carbon credit of the carbon credit supplier, and a corresponding carbon credit supplier asset token, among other elements.

Variation further contemplates a redeemable digital voucher asset token is generated that also corresponds to the one or more salable or transferable carbon credit, and which is generated responsive to detection an exchange of the salable or transferable carbon credit for the carbon credit acquirer payment. In this adaptation, a carbon credit acquirer child block of the blockchain is forged that identifies the redeemable voucher and salable carbon credit.

Figure 3:
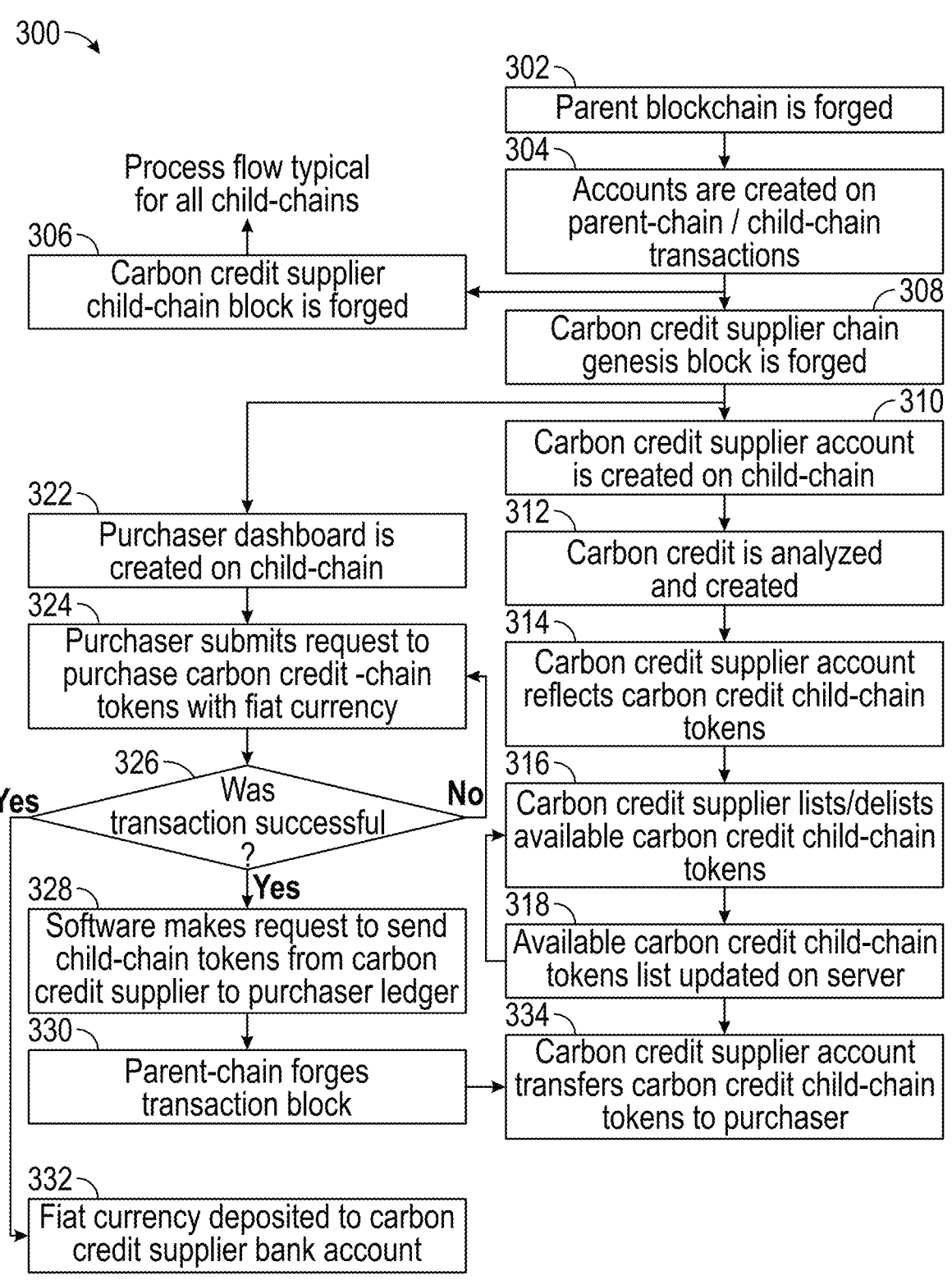
FIG. 3 depicts a configuration of a suitable blockchain.

FIG. 3 illustrates an exemplar flow diagram 300. As illustrated, a parent blockchain is forged 302. Accounts are created on a parent-chain/child-chain transaction 304. A carbon credit supplier child-chain block is forged 306. As will be appreciated by those skilled in the art, the process flow is typical for all child-chains. A carbon credit supplier chain genesis block is forged 308. Once the carbon credit supplier chain genesis block is forged 308, a carbon credit purchaser dashboard is created on a child-chain 322 and a carbon credit supplier account is created on the child chain 310.

Following creation of the carbon credit supplier account 310, the carbon credit is analyzed and created 312. Once the carbon credit is created and analyzed 312, the block is updated with the carbon credit and the carbon credit supplier account is updated to reflect the carbon credit child-chain token(s) 314. The carbon credit supplier can list or delist available carbon credit child-chain tokens 316. Available carbon credit child-chain tokens list is updated on the server 318.

Once the purchaser dashboard is created on the child-chain 322, a carbon credit purchaser submits a request to purchase a carbon credit-chain token(s) with fiat currency 324. Once the request is submitted, the system determines if the transaction was successful 326. If the transaction was not successful (NO), then the purchaser may re-submit the request to purchase the carbon credit 324. If the transaction is successful (YES), a request is sent to carbon credit supplier purchase ledger 328 to reflect a transfer of the carbon credit and the fiat currency is deposited to the carbon credit supplier bank account 332. Following the step of sending child-chain tokens from the supplier ledger to the purchaser ledger 328, the parent-chain forges a transaction block 330, a carbon credit supplier account transfers carbon credit(s) to the child-chain token(s) to the purchaser 334.

Figure 4:
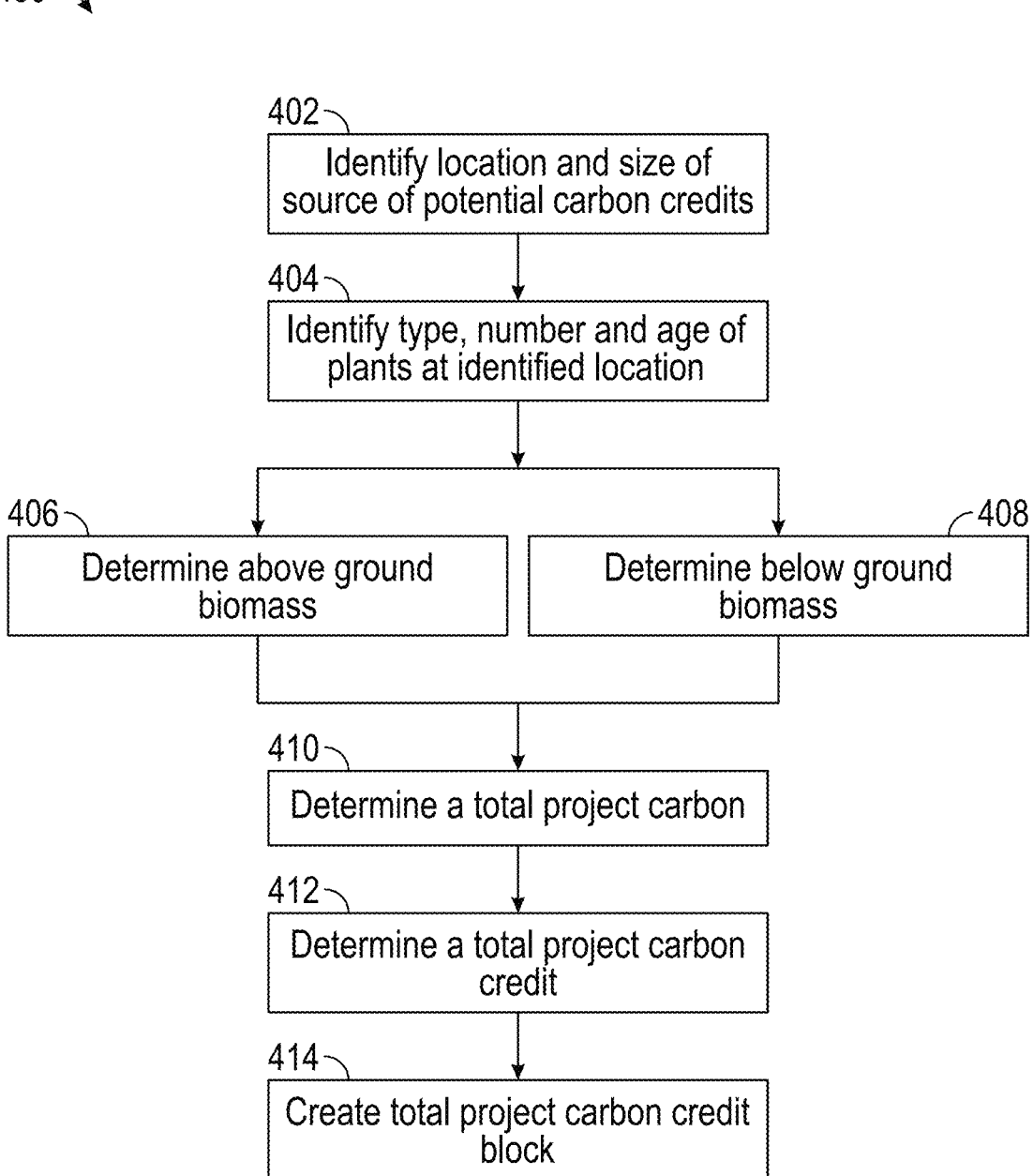
FIG. 4 is a flow diagram of creating a total project carbon credit block.

FIG. 4, shows a process for developing a carbon credit block 400 for a current carbon credit value. Initially, the location and size of the source of potential carbon credits is identified 402. Once the location and size of potential carbon credits is identified 402, the number and age of plants located at the identified location 404 is obtained. Once the number and age of plants is identified, the above-ground biomass 406 and below-ground biomass 408 is determined. The total project carbon 410 is determined from the above-ground biomass and the below-ground biomass. From the total project carbon, a total project carbon credit is determined 412 and a total project carbon credit block 414 is created.

Figure 5:
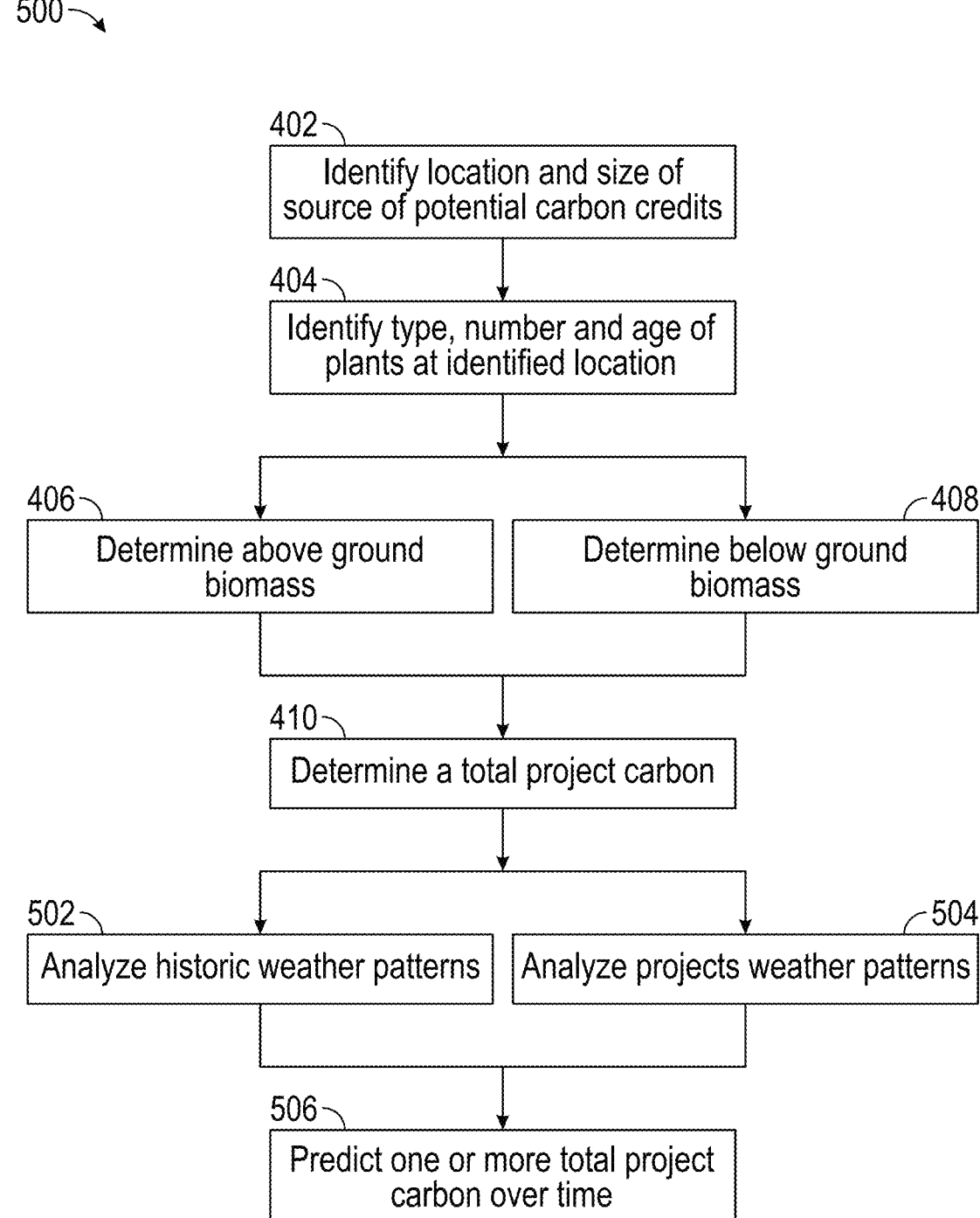
FIG. 5 is a flow diagram of predicting a total project carbon credit over time.

FIG. 5 shows a process for predicting a future carbon credit 500. The future carbon credit can be presented as a future value or as a net present value. Initially, the location and size of the source of potential carbon credits is identified 402. Once the location and size of potential carbon credits is identified 402, the number and age of plants located at the identified location 404 is obtained. Once the number and age of plants is identified, the above-ground biomass 406 and below-ground biomass 408 is determined. The total project carbon 410 is determined from the above-ground biomass and the below-ground biomass. The additional steps of, for example, analyzing historic weather patterns for the identified location 502 and projected weather patterns for the identified location 504 is performed. For example, from the analysis of the historic weather patterns and projected weather patterns, a prediction can be made for the total project carbon over one or more time intervals 506. The future project carbon analysis also considers the age of the plants (or one or more ages of the one or more plants) at the identified location as well as the projected age of the one or more plants based on a standard longevity and the projected growth rate for one or more identified plants as a result of the predicted weather. Additional factors can be considered based on carbon credit supplier input. For example, a predicted drought can be adjusted based on input from the grower about watering sources and/or practices. From the total predicted project carbon, one or more total future carbon credit can be determined 508 over one or more time intervals. The time intervals can be, for example, one year intervals. The total future carbon credit can be in the form of a total projected value or a change in value over time.

Additional data can be collected over time and compared to predicted carbon sequestration and carbon credits. Adjustments can be made over time to the credits provided.

In an additional process, predictive analytics (PA) and machine learning (ML) can be applied to the collected information. The predictive analytics and machine learning can be used to refine the carbon sequestration predictions.

IV. EXAMPLES

Example 1: Apple Trees

The process of quantifying a total project carbon in 20 year old apple trees on 100 acres at an identified location with a current value of $40/metric tonne of $CO_2e$ when apple trees have a typical longevity of 50 years.

The process is for example:

Step 1: Calculate total project carbon above-ground (TP-CAG)=100 acres×3.43 metric tonnes carbon per acre (TCAAG). Result is 343 metric tonnes carbon.

Step 2: Calculate total project carbon below-ground (TPCBG)=100 acres×2.34 metric tonness carbon per acre (TCABG). Result is 234 metric tonnes carbon.

Step 3: Calculate total project carbon (TPC)=343+234=577 metric tonnes carbon.

Step 4: Convert metric tonnes carbon to metric tonnes $CO_2e$=577×3.67=2,117.59 metric tonnes $CO_2e$.

Step 5: Calculate current value of carbon=2,117.59×$40=$84,703.60 (USD).

Step 6: Evaluate a historic weather pattern for the identified location.

Step 7: Evaluate predicted weather patterns for the identified location.

Step 8: Obtain optional apple orchard management information from carbon credit supplier.

Step 9: Select one or more time periods (e.g., monthly, annually, biannually, etc.) and a total amount of future time (e.g., remaining projected life of orchard or set time (e.g., 5 years)).

Step 10: Predict above-ground biomass at one or more future time periods and below-ground biomass at one or more future time periods.

Step 11: Predict one or more predicted total carbon over time.

Step 12: Determine one or more predicted total project carbon credit over time.

Example 2: Grapevines

The process of quantifying a total project carbon in 20 year old grapevines on 100 acres at an identified location with a current value of $40/metric tonne of $CO_2e$ when grapevines have a typical longevity of 30 years.

Step 1: Calculate total project carbon above-ground (TP-CAG)=100 acres×2.22 metric tons carbon per acre (TCAAG). Result is 222 metric tonnes carbon.

Step 2: Calculate total project carbon below-ground (TPCBG)=100 acres×1.78 metric tons carbon per acre (TCABG). Result is 178 metric tonnes carbon.

Step 3: Calculate total project carbon (TPC)=222+178=400 metric tonnes carbon.

Step 4: Convert metric tonnes carbon to metric tonnes $CO_2e=400×3.67=1,468$ metric tonnes $CO_2e$.

Step 5: Calculate current value of carbon=1,468×$40=$58,720.

Step 6: Evaluate a historic weather pattern for the identified location.

Step 7: Evaluate predicted weather patterns for the identified location.

Step 8: Obtain optional grapevine management information from carbon credit supplier.

Step 9: Select one or more time periods (e.g., monthly, annually, biannually, etc.) and a total amount of future time (e.g., remaining projected life of the grapevines or set time (e.g., 5 years)).

Step 10: Predict above-ground biomass at one or more future time periods and below-ground biomass at one or more future time periods.

Step 11: Predict one or more predicted total carbon over time.

Step 12: Determine one or more predicted total project carbon credit over time.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that any claims presented define the scope of the invention and that methods and structures within the scope of these claims and their equivalents be covered thereby.

What is claimed:

1. A system for quantifying an organic plant sequestered carbon comprising:

a position sensing device operable to determine a location of a parcel of land;

a soil monitoring device operable to monitor one or more soil conditions;

a first communication system operable to transmit data from the position sensing device and the soil monitoring device;

a second communication system operable to receive the data about the location of the parcel of land and the one or more soil conditions; and a processing device operable to:

obtain a location for a parcel of land based on the data;

calculate an area of the parcel of land based on the data;

identify one or more categories of plants growing on the parcel of land based on the data;

extract a volume of the one or more identified categories of plants growing on the parcel of land based on the data;

analyze the volume of the one or more identified categories of plants growing on the parcel of land;

extract a percentage of an above-ground biomass of each of the one or more categories of plants growing on the parcel of land from the analyzed volume of the one or more categories of plants;

extract a percentage of a below-ground biomass of each of the one or more categories of plants growing on the parcel of land from the analyzed volume of the one or more categories of plants;

compute a total project carbon above-ground (TPCAG) value from the extracted percentage of the above-ground biomass of each of the one or more categories of plants;

compute a total project carbon below-ground (TPCBG) value from the extracted percentage of the below-ground biomass of each of the one or more categories of plants; and compute a total project carbon (TPC) by combining the TPCAG value and the TPCBG value.

2. The system of claim 1 wherein the categories of plants is selected from agricultural trees and grapevines.

3. The system of claim 1 wherein the TPC is converted to a metric tonnes of $CO_2e$.

4. The system of claim 1 further comprising determine an age of the one or more categories of plants growing on the parcel of land.

5. The system of claim 1 further comprising determine a longevity of the one or more categories of plants growing on the parcel of land.

6. The system of claim 1 further comprising calculate a future total project carbon (FTPC).

7. The system of claim 6 further comprising one or more of analyze historic weather patterns and analyze projected weather patterns.

8. The system of claim 6 further comprising select one or more future time frames.

9. The system of claim 1 further comprising identify one or more similar parcels of land, analyze carbon sequestration for the one or more similar parcels of land, perform predictive analytics for the parcel of land based to determine a total project carbon based on the analyzed one or more similar parcels of land.

10. The system of claim 1 further comprising:

a server computer in communication with a mobile unit, the server computer comprising a data store for storing the set of data;

a processor in communication with the second communication system and the data store; and a computer readable medium having stored thereon a set of instructions executable by the processor to cause the server computer to perform one or more operations, the set of instructions comprising instructions to store the set of data at the data store;

instructions to calculate, based at least in part on the set of data, a sequestered carbon;

instructions to verify, based at least in part on the calculated amount of sequestered carbon, a carbon credit amount; and instructions to generate output indicating a verified amount of carbon credit.

* * * * *